(12) United States Patent
Huebl

(10) Patent No.: US 9,671,045 B1
(45) Date of Patent: Jun. 6, 2017

(54) AIR HOSE SUPPORTING APPARATUS

(71) Applicant: David Huebl, Maplewood, MN (US)

(72) Inventor: David Huebl, Maplewood, MN (US)

( * ) Notice: Subject to any disclaimer, the term of this patent is extended or adjusted under 35 U.S.C. 154(b) by 136 days.

(21) Appl. No.: 14/067,553

(22) Filed: Oct. 30, 2013

(51) Int. Cl.
*F16L 3/12* (2006.01)
*F16L 3/00* (2006.01)
*F16M 11/00* (2006.01)

(52) U.S. Cl.
CPC .............. *F16L 3/1226* (2013.01); *F16L 3/003* (2013.01); *F16M 11/00* (2013.01)

(58) Field of Classification Search
CPC .... H01Q 1/125; H01Q 1/1235; H01Q 1/1228; E03C 1/066; B60G 13/006; B60G 15/07; A01K 97/10; A45B 11/00; A45B 17/00; F16M 13/022; F16M 13/02; B05B 15/06; B05B 15/061; B05B 7/2405; F16L 3/1226; F16L 3/003
USPC ........ 248/75, 79, 230.1, 523, 535, 539, 540, 248/541; 239/273, 152, 379, 526
See application file for complete search history.

(56) References Cited

U.S. PATENT DOCUMENTS

| | | | | |
|---|---|---|---|---|
| RE16,284 E * | 3/1926 | Spaeth | ........................ | B05B 1/22 141/352 |
| 3,076,608 A * | 2/1963 | Valles | .................... | B05B 7/2405 239/526 |
| 3,293,528 A * | 12/1966 | Rosen | .................... | H01M 10/46 206/362.2 |
| 3,924,097 A * | 12/1975 | Knowles | ............... | H02J 7/0045 219/229 |
| 4,136,848 A * | 1/1979 | McCollum | ............. | A01K 97/08 248/205.6 |
| 4,500,064 A * | 2/1985 | Calabro | .................. | E04H 12/22 248/539 |
| 4,798,008 A * | 1/1989 | Belanger | ................. | B60S 3/002 15/302 |
| 5,961,092 A * | 10/1999 | Coffield | ........................ | 248/539 |
| 6,061,990 A * | 5/2000 | McMahon | ............ | E04G 15/061 248/523 |
| 6,375,146 B1 * | 4/2002 | Painchaud | ............. | A01K 97/10 248/534 |
| 8,403,278 B1 * | 3/2013 | Kasbohm | ................ | F41C 33/06 211/64 |
| 8,439,325 B2 * | 5/2013 | Lee | ...................... | H01Q 1/1228 248/218.1 |
| 8,448,270 B2 * | 5/2013 | Yang | ...................... | E03C 1/066 248/218.4 |
| 2004/0084575 A1 * | 5/2004 | McCambridge | ......... | A45D 1/00 248/117.2 |

(Continued)

FOREIGN PATENT DOCUMENTS

EP    EP 0720870 A2 *  7/1996  .......... B05B 7/2405
GB    EP0720870 A2 *  7/1996

*Primary Examiner* — Muhammad Ijaz
(74) *Attorney, Agent, or Firm* — Jacobson and Johnson LLC; Thomas N. Phung

(57) ABSTRACT

An air hose supporting apparatus comprising a housing having a pair of sidewalls, a first end, a second end, a top surface and an air hose workstation surface engaging base located distal the top surface of the housing, an elongated air hose receptacle extending through the housing with the elongated air hose receptacle having an open end, a closed end, and an air hose supporting sidewall tapering from the open end to the closed end, and a means for maintaining the base to the air hose workstation surface.

10 Claims, 5 Drawing Sheets

(56) References Cited

U.S. PATENT DOCUMENTS

2007/0257484 A1* 11/2007 Schindel ................ F16L 37/28
                                                                           285/93
2014/0090732 A1* 4/2014 Schieler ................ B25C 1/041
                                                                         137/565.18

* cited by examiner

AIR HOSE SUPPORTING APPARATUS

FIELD OF THE INVENTION

This invention relates generally to air hose tools and, more specifically to an air hose supporting apparatus for receiving and supporting a portion of an end of an air hose and/or an end of an air tool on an air hose workstation surface when the air hose and/or an air tool are not in use.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of air powered tools or pneumatic powered tools, which are driven by compressed air supplied by an air compressor is well known in the art. In the general operation of the air powered tools air pressure is provided by an air compressor, which typically has a gas-powered pump mechanism that continually forces air into a steel container tank until the air inside the container tank becomes pressurized. The pneumatic tool is hooked up to an air hose that is attached to the tank via an air valve to provide the pneumatic tool with a source of power via the movement of the pressurized air through the pneumatic tool.

Although air powered tools have become a common place in most repair shops' workstations, one of the problems associated with the use of air powered tools is that once detached from the air powered tools, the end of the air hoses has a tendency to fall to the ground surface which can be burdensome and inefficient for a user performing various time sensitive tasks such as auto body painting to have to not only constantly search for the end of the air hose but also to bend down and pick up the end of the air hose for reattachment to the air powered tools. Magnetic air hose holders consisting of a fork-shaped handle secured to a magnetic base have been used in attempt to solve the aforementioned problem but they often times have difficulty in maintaining a hold to air hose resulting in the end of the air hose falling to the ground or conversely maintaining to strong of a hold on the air hose resulting in the user having difficulties in removing the air hose from the fork-shaped handle, especially while performing various time sensitive tasks. There thus is a need for an air hose supporting apparatus for quickly receiving, supporting, and maintaining a portion of an end of an air hose therein while still allowing the user to easily access air hose while performing various time sensitive tasks

BRIEF SUMMARY OF THE INVENTION

The present invention comprises an air hose supporting apparatus having a housing with a pair of sidewalls, a first end, a second end, a top surface and an air hose workstation surface engaging base located distal the top surface of the housing. The air hose supporting apparatus includes an elongated air hose receptacle extending through the housing with the elongated air hose receptacle having an open end, a closed end, and an air hose supporting sidewall tapering from the open end to the closed end of the elongated air hose receptacle. The air hose supporting apparatus further includes a means for maintaining the base to the air hose workstation surface.

The present invention may also comprise an air hose supporting apparatus having a housing with a pair of sidewalls, a first end, a second end, a top surface and an air hose workstation surface engaging base located distal to the top surface of the housing. The air hose supporting apparatus includes an elongated air hose receptacle connected to the top surface of the housing with the elongated air hose receptacle having an open end, a closed end, and an air hose supporting sidewall tapering from the open end to the closed end of the elongated air hose receptacle. The air hose supporting apparatus further includes a means for maintaining the base to the air hose workstation surface such as at least two fastener slots located on the sidewalls of the housing with the fastener slots supporting a fastener there through for maintaining the base to a surface of an air hose workstation.

DESCRIPTION OF THE PREFERRED EMBODIMENT

Figure 1:
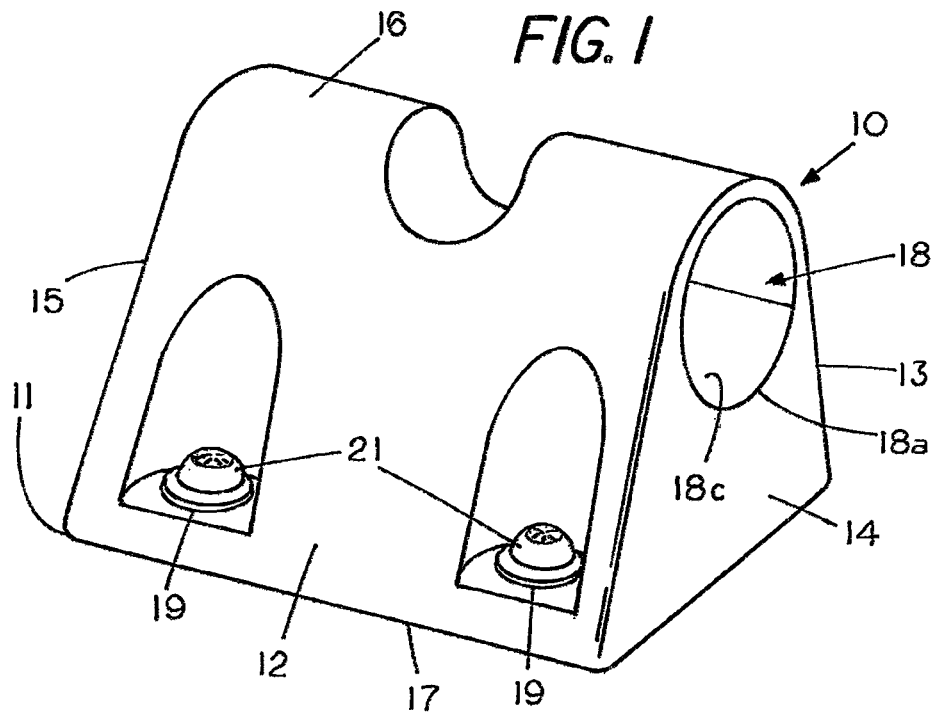
FIG. 1 is a perspective view showing an integral one-piece air hose supporting apparatus.

Referring now specifically to the drawings, in which identical or similar parts are designated by the same reference numerals throughout, a detailed description of the present invention is given. It should be understood that the following detailed description relates to the best presently known embodiment of the invention. However, the present invention can assume numerous other embodiments, as will become apparent to those skilled in the art.

Figure 2:
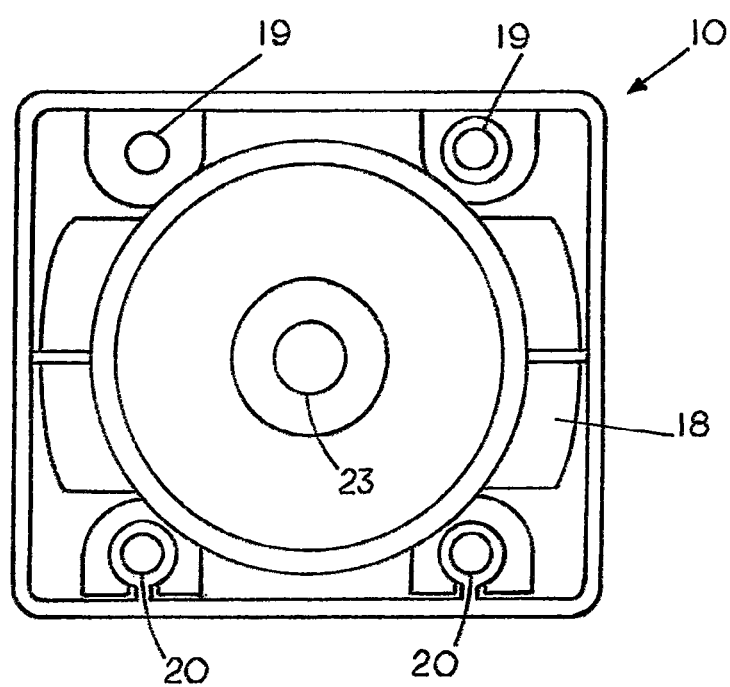
FIG. 2 shows a bottom view of the piece air hose supporting apparatus of FIG. 1.
Figure 3:
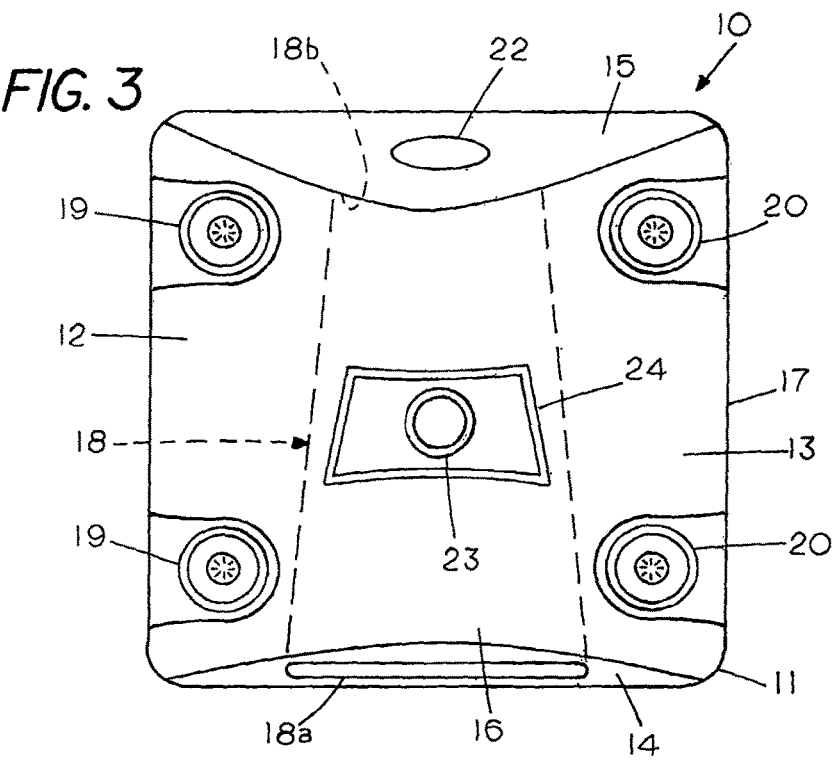
FIG. 3 shows a top view of the piece air hose supporting apparatus of FIG. 1.

Referring to FIGS. 1, 2, and 3, FIG. 1 is a perspective view, FIG. 2 is a bottom view, and FIG. 3 is a top view each showing an embodiment of the present invention comprising an integral one-piece air hose supporting apparatus 10 ideally for use in receiving and supporting a portion of an air hose 71 and/or an air tool on an air hose workstation surface when the air hose and/or an air tool are not in use. Air hose supporting apparatus 10 includes a housing 11 having a pair of sidewalls 12, 13, a first end 14, a second end 15, a top surface 16 and an air hose workstation surface engaging base 17 located distal top surface 16 of housing 11.

Air hose supporting apparatus 10 also includes an elongated air hose receptacle 18 having an open-end 18a, a closed end 18b, and an air hose supporting sidewall 18c tapering from the open-end 18a to the closed end 18b of elongated air hose receptacle 18 for engaging, supporting and maintaining a portion of an end of an air hose therein so as to prevent the end of the air hose from falling to the ground or randomly swinging and striking surfaces and objects while not in use. Although air hose supporting sidewall 18c is disclosed in the embodiment of FIGS. 1, 2, and 3 as tapering from the open-end 18a to the closed end 18b of elongated air hose receptacle 18, alternative embodiments may comprise an elongated air hose receptacle having an air hose supporting sidewall that runs linearly or is non-tapering from an open-end to a closed end of the elongated air hose receptacle. In the embodiment of FIG. 1 elongated air hose receptacle 18 is shown extending through housing 11 with the open-end 18a of elongated air hose receptacle 18 located on the first end 14 of housing 11 and closed end 18b of elongated air hose receptacle 18 located on the second end 15 of housing 11. Although elongated air hose receptacle 18 may vary in length from the open-end 18a to the closed end 18b, a feature of the present invention is that the length of elongated air hose receptacle is specifically tailored to enable of elongated air hose to not only support a portion of an end of an air hose therein but also to maintain the end of the air hose therein while the hose is not in use through the engagement of at least a portion of the air hose supporting sidewall with a portion of the end of the air hose. An example of a suitable length for elongated air hose receptacle 18 may include but is not limited to 2 inches and above and preferably 3 inches and above but exterior factors must also be considered including but not limited to the circumference of the air house, the material of the air hose, the flexibility of the air hose.

Air hose supporting apparatus 10 also includes a means for securing and maintaining air hose workstation surface engaging base 17 to any air hose workstation surface. In the embodiment of FIGS. 1, 2, and 3, the means for securing and maintaining air hose workstation surface engaging base 17 to the air hose workstation surface is shown as comprising a pair of fastener slots 19, 20 located on each of the sidewalls 12, 13 of housing 11, with each of the slot of fastener slots 19, 20 supporting a fastener such as screw 21, which may be extended there through and attached to a portion of the air hose workstation surface for supporting and maintaining air hose workstation surface engaging base 17 to the surface of the air hose workstation. It is noted that although air hose supporting apparatus 10 shows a pair of fastener slots 19, 20 located on each of the side of housing 11 for securing and maintaining air hose workstation surface engaging base 17 to the air hose workstation surface, alternative embodiments of the present invention may comprise an air hose supporting apparatus having as few as one slot to a plurality of slots located on the side of housing 11 or alternatively, a different means for securing and maintaining air hose workstation surface engaging base 17 to the air hose workstation surface including but not limited to the use of some type of adhesive, a hook and loop fastener system similar to that of VEL-CRO®, a bracket tracking system, and magnets. In addition, it is also noted that air hose workstation surface engaging base 17 may either be permanently or alternatively temporarily secured to the air hose workstation surface.

Referring to FIG. 3, air hose supporting apparatus 10 is shown as including an optional air tool-supporting slot 22 extending through a portion of the closed end 18b of elongated air hose receptacle 18. Air tool supporting slot 22 functions for receiving and supporting an end portion of an air tool such as a spraying tip of a painting air-gun or air blower when the free end of the air hose is in use and attached to the air tool.

The embodiment of the air hose supporting apparatus 10 of FIGS. 1, 2, and 3 also includes an optional internal fastener slot 23 extending from a portion of the tapering sidewall 18c of elongated air hose receptacle 18 to air hose workstation surface engaging base 17. Internal fastener slot 23 functions to support a fastener such as screw 21 therethrough for either providing for the sole means in maintaining air hose workstation surface engaging base 17 to the surface of the air hose workstation or for assisting other primary means for maintaining air hose workstation surface engaging base 17 to the surface of the air hose workstation such as for example fastener slots 19, 20 and screws 21.

Air hose supporting apparatus 10 also includes an access orifice 24 preferably located on or proximal the top surface 16 and position so as to correspond to internal fastener slot 23 of housing 11, access orifice 24 providing user access to internal fastener slot 23.

Although the embodiment of FIGS. 1, 2, and 3 shows air hose supporting apparatus 10 having one internal fastener slot 23 and one corresponding access orifice 24, alternative embodiments of the present invention may comprise air hose supporting apparatuses having multiple internal fastener slots extending from a portion of a sidewall of an elongated air hose receptacle to an air hose workstation surface engaging base and as few as one to a plurality of corresponding access orifice located on the housing of the air hose supporting apparatus for providing user access to each of the internal fastener slots.

Figure 4:
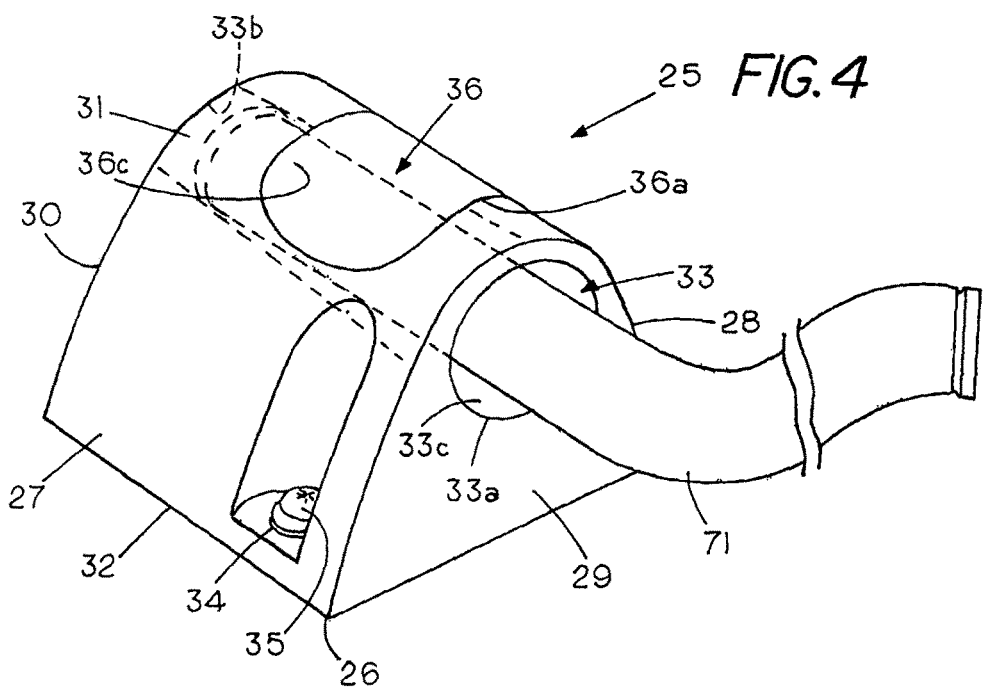
FIG. 4 perspective view showing an alternative embodiment of integral one-piece air hose supporting apparatus.
Figure 5:
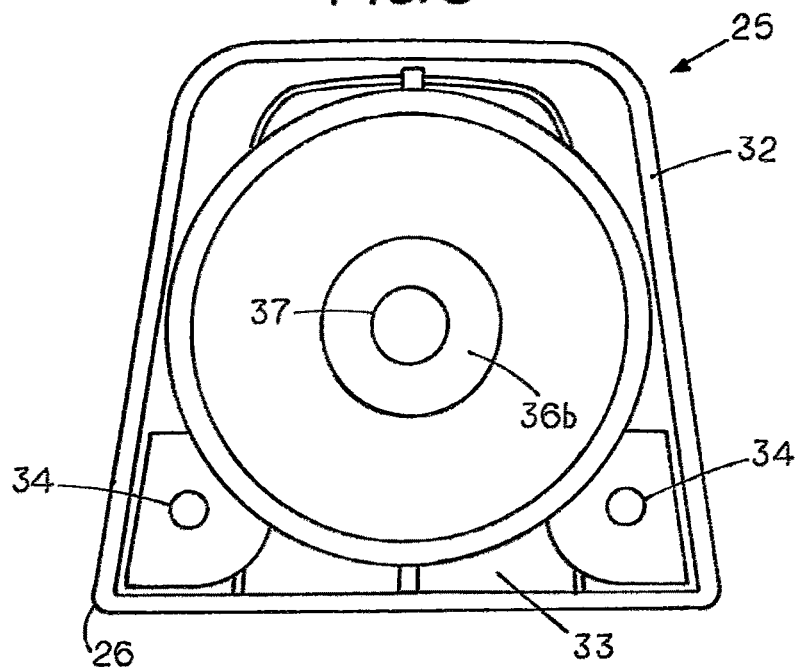
FIG. 5 shows a bottom view of the piece air hose supporting apparatus of FIG. 4.
Figure 6:
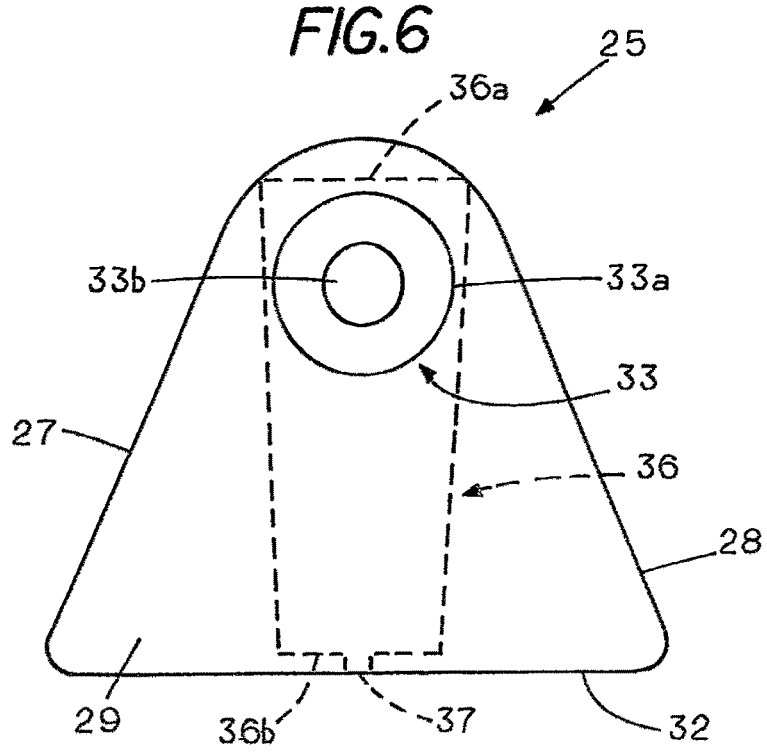
FIG. 6 shows a side view of the air hose supporting apparatus of FIG. 4.

Referring to FIGS. 4, 5, and 6, FIG. 4 is a perspective view, FIG. 5 is a bottom view, and FIG. 6 is a side view each showing an embodiment of the present invention comprising an integral one-piece air hose supporting apparatus 25. Similar to the air hose supporting apparatus 10 of FIGS. 1-3, air hose supporting apparatus 25 includes a housing 26 having a pair of sidewalls 27, 28, a first end 29, a second end 30, a top surface 31 and an air hose workstation surface engaging base 32 located distal top surface 31 of housing 26.

Air hose supporting apparatus 25 also includes a first elongated air hose receptacle 33 having an open-end 33a, a closed end 33b, and an air hose supporting sidewall 33c tapering from the open-end 33a to the closed end 33b of elongated air hose receptacle 33 with the open-end 33a of elongated air hose receptacle 33 located on the first end 29 of housing 26 and the closed end 33b of elongated air hose receptacle 33 located on the second end 30 of housing 26. Tapering air hose supporting sidewall 33c functions to support and maintain a portion of an end of an air hose therein so as to prevent the end of the air hose from falling to the ground when the end of the air hose is detached and not in use.

Air hose supporting apparatus 25 also includes a means for securing and maintaining air hose workstation surface engaging base 32 to any air hose workstation surface. In the embodiment of FIGS. 4, 5, and 6, the means for securing and maintaining air hose workstation surface engaging base 32 to the air hose workstation surface is shown as comprising a fastener slot 34 located on each of the sidewalls 27, 28 of housing 26, with each of the slot of fastener slots 34 supporting a fastener such as screw 35 therethrough for supporting and maintaining air hose workstation surface engaging base 32 to the surface of the air hose workstation.

The embodiment of the air hose supporting apparatus 25 of FIGS. 4-6 is shown further including a second elongated air hose receptacle 36 having an open-end 36a, a closed end 36b, and an air hose supporting sidewall 36c tapering from the open-end 36a to the closed end 36b of elongated air hose receptacle 36 with the open-end 36a of elongated air hose receptacle 36 located on the top surface 31 of housing 26 and closed end 36b of elongated air hose receptacle 33 located on or proximal the air hose workstation surface engaging base 32 of housing 26. Similar to air hose supporting apparatus 10, the air hose is maintained within air hose supporting apparatus 25 through the engagement of at least a portion of the air hose supporting sidewall of the first elongated air hose receptacle 33 or the second elongated air hose receptacle 36 with a portion of the end of the air hose.

Air hose supporting apparatus 25 also includes an optional internal fastener slot 37 extending from a portion of the closed end 36b of second elongated air hose receptacle 36 to air hose workstation surface engaging base 32. Similar to internal fastener slot 23 internal fastener slot 36 functions to support a fastener such as screw 35 therethrough for either providing for the sole means in maintaining air hose workstation surface engaging base 32 to the surface of the air hose workstation or for assisting other primary means for maintaining air hose workstation surface engaging base 32 to the surface of the air hose workstation such as for example an adhesive or fastener slots 34 and screws 35. User access to internal fastener slot 37 is provided by the open-end 36a of second elongated air hose receptacle 36 and as such, unlike air hose supporting apparatus 10, an access orifice similar to access orifice 24 is not required.

Although the embodiment of FIGS. 4-6 shows air hose supporting apparatus 25 having first elongated air hose receptacle 33 extending from the first end 33a to the second end 33b of housing 26 and second elongated air hose receptacle 36 extending from the top surface 31 to the air hose workstation surface engaging base 32 of housing 26, alterative embodiments may comprise an air hose supporting apparatus having a third elongated air hose receptacle extending from one of the walls of the housing to an opposing wall of the housing. Alternative embodiments may further comprise air hose supporting apparatuses having an elongated air hose receptacle extending from a first end to a second end of a housing, or an elongated air hose receptacle extending from a top surface to a air hose workstation surface engaging base of a housing, or an elongated air hose receptacle extending from one of the walls of the housing to an opposing wall of the housing, or any combination thereof.

Figure 7:
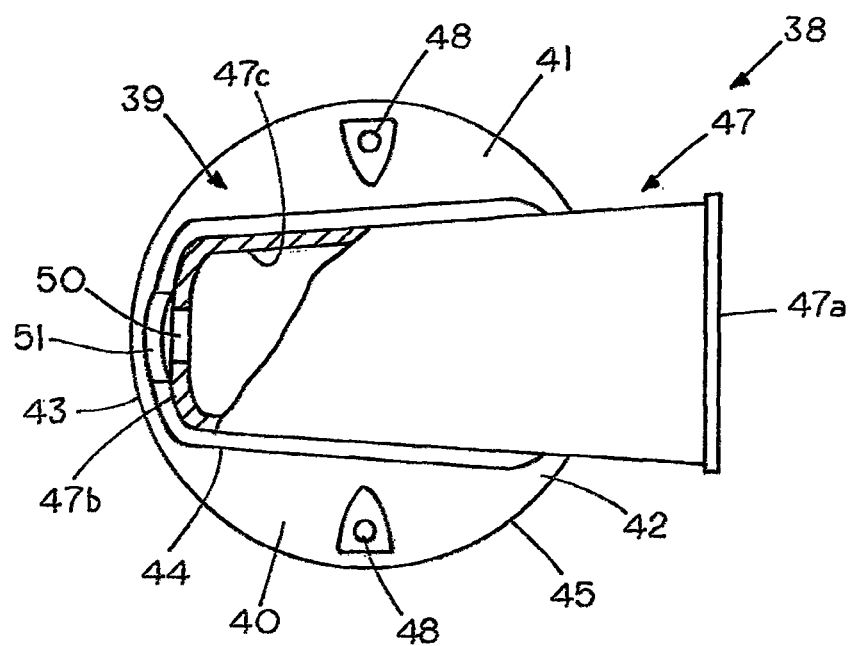
FIG. 7 is a top view showing a two-piece air hose supporting apparatus.
Figure 8:
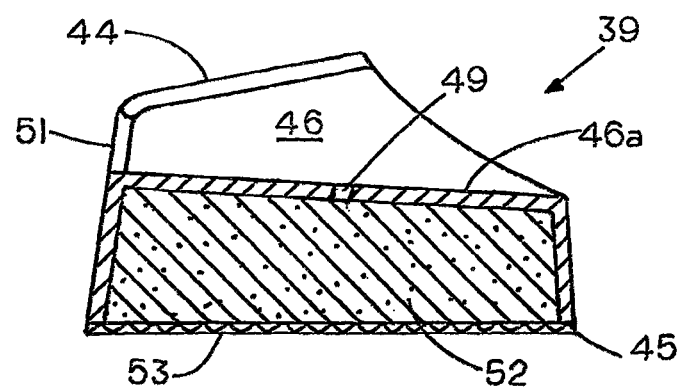
FIG. 8 shows a cross-sectional view of a housing of the air hose supporting apparatus of FIG. 7.

Referring to FIGS. 7 and 8, FIG. 7 is a top view showing an embodiment of the present invention comprising a two-piece air hose supporting apparatus 38. Air hose supporting apparatus 38 includes a housing 39 having a pair of sidewalls 40, 41, a first end 42, a second end 43, a top surface 44 and an air hose workstation surface engaging base 45 located distal top surface 44 of housing 39. FIG. 8 shows a cross-sectional view of housing 39.

Air hose supporting apparatus 38 also includes a separate elongated air hose receptacle 47 having an open-end 47a, a closed end 47b, and an air hose supporting sidewall 47c extending and preferably also tapering from the open-end 47a to the closed end 47b of elongated air hose receptacle 47. Referring to FIG. 8, top surface 44 of housing 39 also includes a recess 46 extending downward from the top surface 44 of housing 39 with recess 46 having a shape for mating attachment to a portion of an exterior sidewall 47d of elongated air hose receptacle 47 therein with a portion of the exterior sidewall 47 of elongated air hose receptacle 47 engaging a lower surface 47a of recess 47 when air hose supporting apparatus 38 is in a ready to use condition. Although elongated air hose receptacle 47 is preferably secured to recess 46 through a frictional fit between their two surfaces, elongated air hose receptacle 47 may alternatively be secured to recess 46 by a variety of means including by not limited to the use of an adhesive, heat bonding, a mechanical locking mechanism or the like.

Air hose supporting apparatus 38 also includes a means for securing and maintaining air hose workstation surface engaging base 45 to any air hose workstation surface comprising a fastener slot 48 located on each of the sidewalls 40, 41 of housing 39, with each of the slot of fastener slots 48 supporting a fastener such as screw (not shown) therethrough for supporting and maintaining air hose workstation surface engaging base 45 to the surface of the air hose workstation. Air hose supporting apparatus 38 further includes an optional internal fastener slot 49 located on a portion of the lower surface 47a of recess 47. Internal fastener slot 49 functions to support a fastener therethrough for either providing for the sole means in maintaining air hose workstation surface engaging base 45 to the surface of the air hose workstation or for assisting other means for maintaining air hose workstation surface engaging base 45 to the surface of the air hose workstation.

Also shown in the embodiment of FIG. 7 is an optional air tool-supporting slot 50 extending through a portion of the closed end 47b of elongated air hose receptacle 47 and a corresponding orifice 51 located on the second end 43 of housing 39. Air tool supporting slot 50 and orifice 51 cooperative to function for receiving and supporting a portion of an air tool such as for example a spraying tip of a painting air-gun or air blower tool there through.

Referring to FIG. 8, air hose supporting apparatus 38 is also shown as including a weighted material such as cement or metal puck or the like supported within housing 39 to assist in maintaining air hose workstation surface engaging base 45 to a horizontal surface of an air hose workstation. Air hose supporting apparatus 38 is further shown including a slip-resistant layer extending from air hose workstation surface engaging base 45 to further assist in maintaining air hose workstation surface engaging base 45 to the horizontal surface of an air hose workstation.

Figure 9:
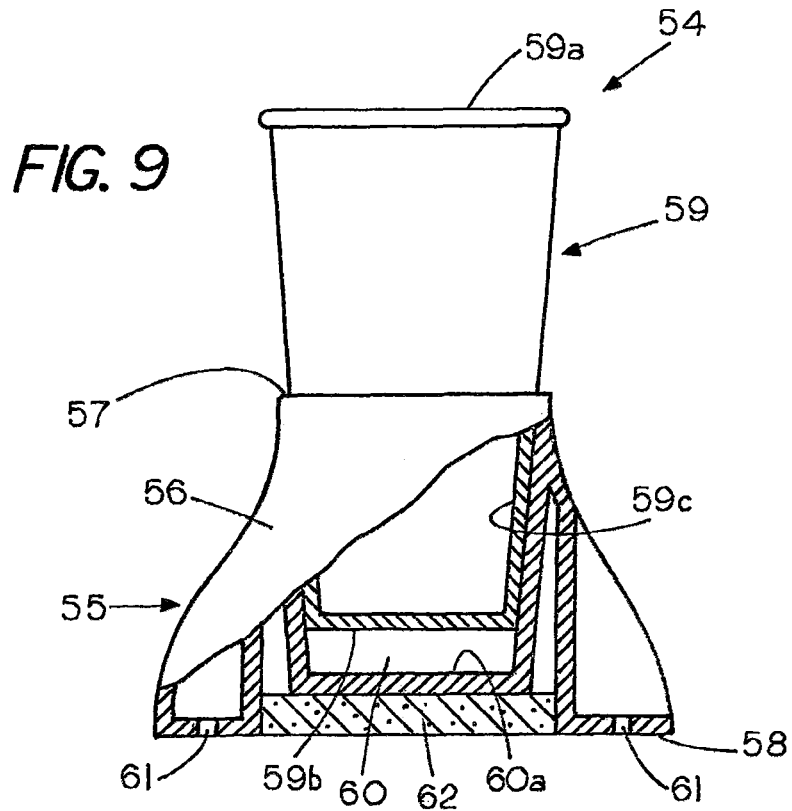
FIG. 9 is a partial cross-sectional side view showing an alternative embodiment of a two-piece air hose supporting apparatus.

FIG. 9 is a partial cross-sectional side view showing an alternative embodiment of the present invention comprising a two-piece air hose supporting apparatus 54. Air hose supporting apparatus 54 includes a housing 55 having a sidewall 56, a top surface 57 and an air hose workstation surface engaging base 58 located distal top surface 57 of housing 55.

Air hose supporting apparatus 54 also includes a separate elongated air hose receptacle 59 having an open-end 59a, a closed end 59b, and an air hose supporting sidewall 59c tapering from the open-end 59a to the closed end 59b of elongated air hose receptacle 59. The top surface 57 of housing 55 also includes a recess 60 extending downward from top surface 57 of housing 55 with recess 60 having a shape for mating attachment to a portion of an exterior sidewall 59d of elongated air hose receptacle 59 therein with the closed end 59b of elongated air hose receptacle 59 engaging a lower surface 59a of recess 59 when air hose supporting apparatus 54 is in a ready to use condition. Although elongated air hose receptacle 59 is preferably secured to recess 60 through a frictional fit between their two surfaces, elongated air hose receptacle 59 may alternatively be secured to recess 60 by a variety of means similar to those discussed for air hose supporting apparatus 38.

Air hose supporting apparatus 54 also includes a pair of fastener slots 61 located directly opposite of each other on the sidewall 56 of housing 55, with each of the slot of fastener slots 61 supporting a fastener such as screw (not shown) there through for supporting and maintaining air hose workstation surface engaging base 58 to the surface of the air hose workstation.

Air hose supporting apparatus 54 is shown as further including a magnet or the like located within housing 55 to assist in maintaining air hose workstation surface engaging base 58 to a metallic horizontal surface of an air hose workstation.

Figure 10:
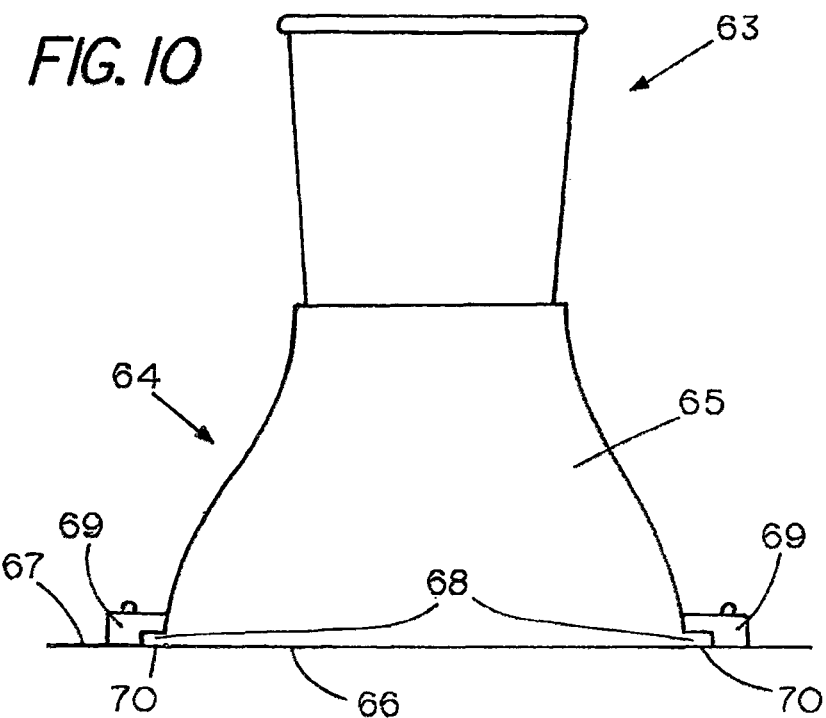
FIG. 10 is a side view showing an alternative embodiment of a two-piece air hose supporting apparatus having a track securement system.

FIG. 10 is a side view showing an alternative embodiment of the present invention comprising a two-piece air hose supporting apparatus 63 similar in parts to that of air hose supporting apparatus 54. However, instead of having a pair of fastener slots located on a sidewall 65 of housing 64 for supporting a fastener there through for maintaining air hose workstation surface engaging base 66 to a surface of the air hose workstation 67 as discussed for air hose supporting apparatus 54, air hose supporting apparatus 63 instead shows the use of a track securement system comprising a pair of opposing flanges 68 extending from sidewall 65 of housing 64 located proximal and running parallel to air hose workstation surface engaging base 66 of housing 64 and a pair of brackets 69 securable to air hose workstation surface 67 with brackets 68 cooperating with air hose workstation surface 67 to form pair of opposing slots 70 for receiving the pair of opposing flanges 68 therein to maintain air hose workstation surface engaging base 66 to air hose workstation surface 67.

I claim:

1. An air hose supporting apparatus comprising:
   an air hose for a pneumatic air powered tool, said air hose having a first free end attachable to a source of pneumatic air and a second free end attachable to said pneumatic air powered tool;
   an integral one-piece housing having a pair of sidewalls, a first end, a second end located distal to said first end, a top surface extending from said first end to said second end of said housing and an air hose workstation surface engaging base located distal to said top surface of said housing, said top surface and said air hose workstation surface engaging base each extending from said first and to said second end of said housing;
   an elongated air hose receptacle extending from said first end to said second end of said housing, said elongated air hose receptacle having a central axis running parallel to said air hose workstation surface engaging base, said elongated air hose receptacle having an open end located at said first end of said housing, a closed end located at said second end of said housing, and an air hose supporting sidewall having a uniformly straight portion said receptacle dimensioned to frictionally receive said second free end of said air hose releasably securing said second free end of said air hose within said elongated air hose receptacle;
   an air tool supporting slot located at said closed end of said elongated air hose receptacle for receiving and supporting a portion of said pneumatic air powered tool there through and
   a fastening means positioned on a lower portion of the housing.

2. The air hose supporting apparatus of claim 1 wherein said fastening means comprises at least two fastener slots located on said sidewalls of said housing, said fastener slots each supporting a fastener there through for maintaining said base to a surface of an air hose workstation.

3. The air hose supporting apparatus of claim 1 wherein said fastening means comprises at least one internal fastener slot extending from said sidewall of said elongated air hose receptacle to said base, said internal fastener slot supporting a fastener there through for maintaining said base to a surface of an air hose workstation and at least one access orifice located proximal said top surface of said housing for providing access to said internal fastener slot.

4. The air hose supporting apparatus of claim 1 wherein said fastening means comprises a magnet located proximal to said base.

5. The air hose supporting apparatus of claim 1 wherein said air hose supporting sidewall comprises an air hose supporting sidewall tapering portion tapered from said open end to said closed end of said elongated air hose receptacle.

6. The air hose supporting apparatus of claim 1 wherein said means for maintaining said base to said air hose workstation surface comprises at least one internal fastener slot extending from said closed end of said elongated air hose receptacle to said base, said internal fastener slot supporting a fastener there through for maintaining said base to a surface of an air hose workstation.

7. An air hose supporting apparatus comprising:
   an air hose for a pneumatic air powered tool, said air hose having a first free end attachable to a source of pneumatic air and a second free end attachable to said pneumatic air powered tool;
   an integral one-piece housing having a pair of sidewalls, a first end, a second end located distal to said first end, a top surface and an air hose workstation surface engaging base located distal to said top surface of said housing, said top surface and said air hose workstation surface engaging base each extending from said first end to said second end of said housing;
   an elongated air hose receptacle extending from said first end to said second end of said housing, said elongated air hose receptacle having an open end located at said first end of said housing, a closed end located at said second end of said housing, and
   an air hose supporting sidewall tapering portion tapered from said open end to said closed end of said elongated air hose receptacle, said air hose receptacle dimensioned to frictionally receive said second free end of said air hose releasably securing said second free end of said air hose within said elongated air hose receptacle;
   an air tool supporting slot located at said closed end of said elongated receptacle for receiving and supporting a portion of said pneumatic air powered tool there through; and
   a fastening means positioned on a lower portion of the housing.

8. The air hose supporting apparatus of claim 7 wherein said fastening means comprises at least two fastener slots located on said sidewalls of said housing, said fastener slots each supporting a fastener there through for maintaining said base to a surface of an air hose workstation.

9. An air hose supporting apparatus comprising:
   an air hose of a pneumatic air powered tool, said air hose having a first free end attachable to a source of pneumatic air and a second free end attachable to said pneumatic air powered tool;

a housing having a pair of sidewalls, a first end, a second end located distal to said first end, a top surface and an air hose workstation surface engaging base located distal to said top surface of said housing, said top surface and said air hose workstation surface engaging base each extending from said first end to said second end of said housing;

an elongated air hose receptacle having an open end located at said first end of housing, a closed end located at said second end of housing, and an air hose supporting sidewall tapering portion tapered from said open end to said closed end of said elongated air hose receptacle, said elongated air hose supporting receptacle dimensioned to frictionally receive said second free end of said air hose releasably securing said second free end of said air hose within said elongated air hose receptacle;

an air tool supporting slot located at said closed end of said elongated air hose receptacle for receiving and supporting a portion of said air powered tool there through; and at least two fastener slots located on said sidewalls of said housing, said fastener slots each supporting a fastener there through for maintaining said air hose workstation surface engaging base to a surface of an air hose workstation.

10. The air hose supporting apparatus of claim 9 including a magnet located proximal to said air hose workstation surface engaging base for further maintaining said base to a surface of an air hose workstation.

\* \* \* \* \*